United States Patent

[11] 3,602,587

| [72] | Inventors | Stephen Blecher<br>Littleton;<br>Earle D. Riley, Jr., Wheat Ridge, both of, Colo. |
|---|---|---|
| [21] | Appl. No. | 759,608 |
| [22] | Filed | Sept. 13, 1968 |
| [45] | Patented | Aug. 31, 1971 |
| [73] | Assignee | Honeywell, Inc.<br>Minneapolis, Minn. |

[54] PROJECTING APPARATUS
10 Claims, 30 Drawing Figs.

[52] U.S. Cl. ...................................................... 353/21,
353/118
[51] Int. Cl. ............................................... G03b 21/00,
G03b 23/04
[50] Field of Search ........................................... 353/21,
116, 118

[56] References Cited
UNITED STATES PATENTS
3,171,222 3/1965 Sakaki et al. ................. 353/118

3,336,836 8/1967 Gould et al. ................. 353/21
3,480,357 11/1969 Tsuyama et al. .............. 353/21

*Primary Examiner*—Harry N. Haroian
*Attorneys*—Arthur H. Swanson, Lockwood D. Burton and J. Shaw Stevenson ABSTRACT: The present invention relates to improvements in slide projectors and in particular to an apparatus for: 1. Simultaneously ejecting any two bound or unbound, cardboard, plastic or glass mounted slides which are of different thickness out of and away from a tray in a straight path into a fixed spaced apart relationship along a track and in a unitary slide pulling jaw member and 2. Providing a construction for the jaw member that will continue to move the slides in said straight path while one of the slides hits a first stop and is wiped off of the moving jaw member when it reaches a "preview" position and the other of said slides hits a second stop and is wiped off of the jaw member when it reaches a "show" position.

INVENTORS.
STEPHEN BLECHER
EARLE D. RILEY, JR.
BY
John Shaw Stevenson
AGENT.

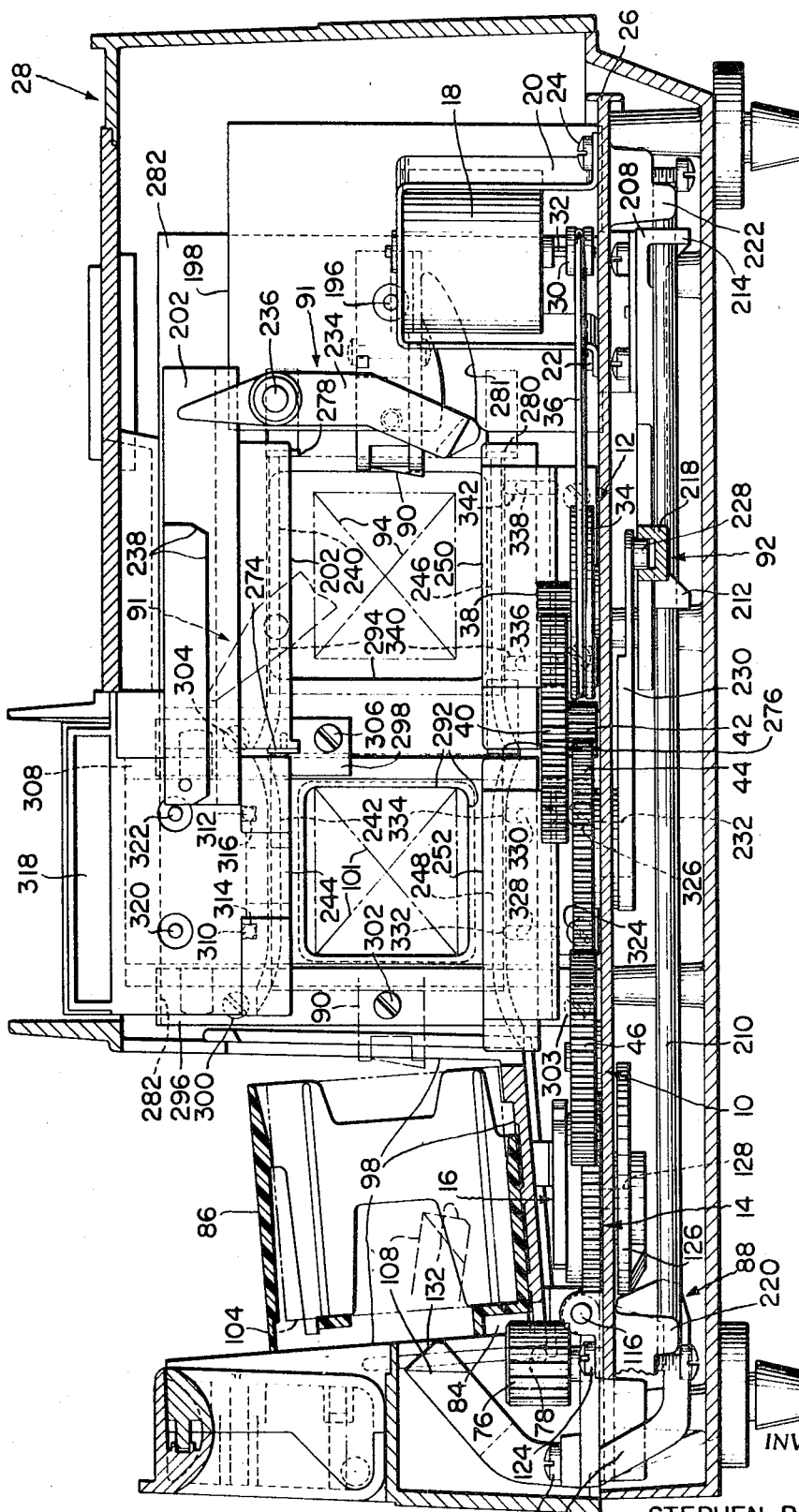

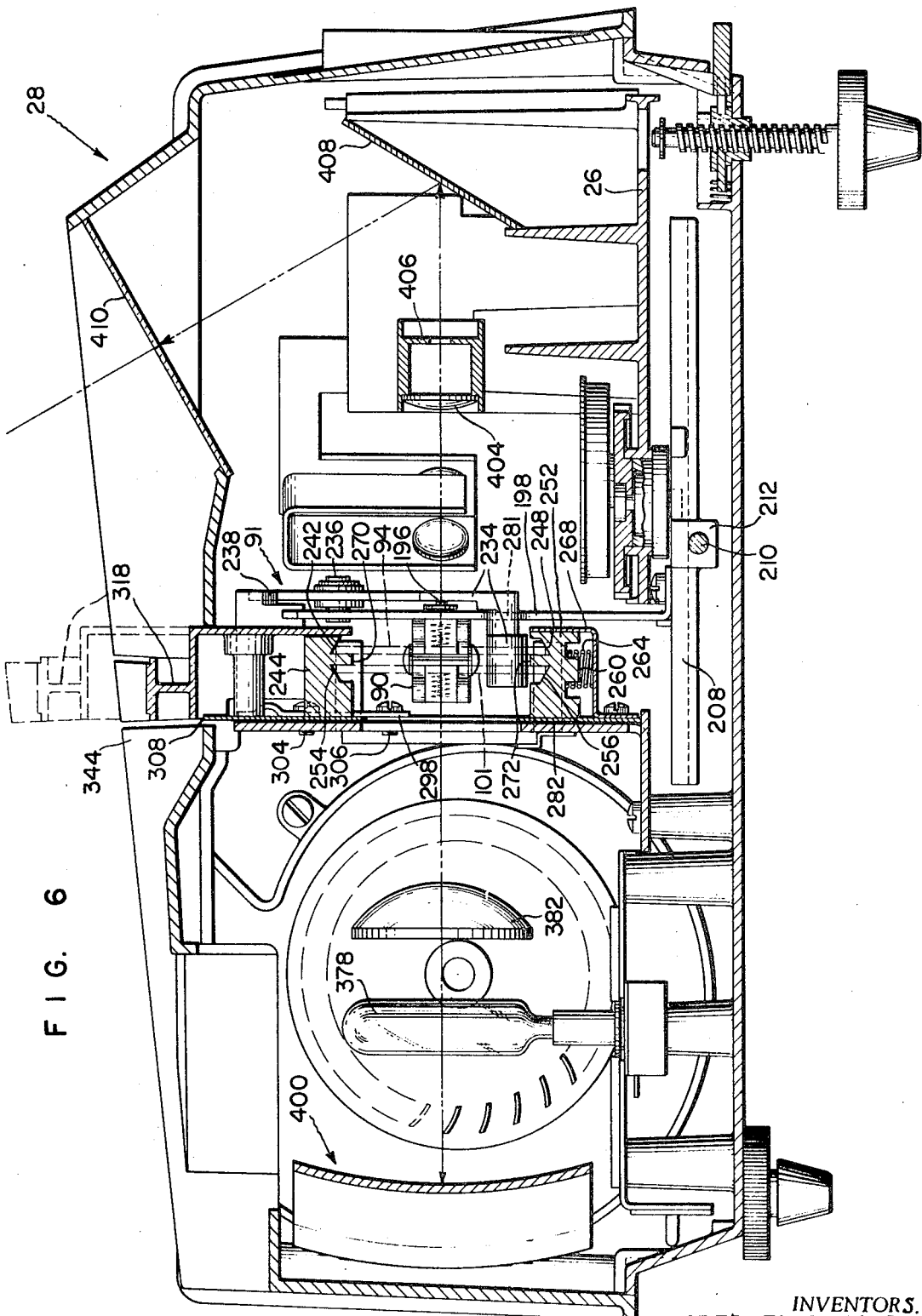

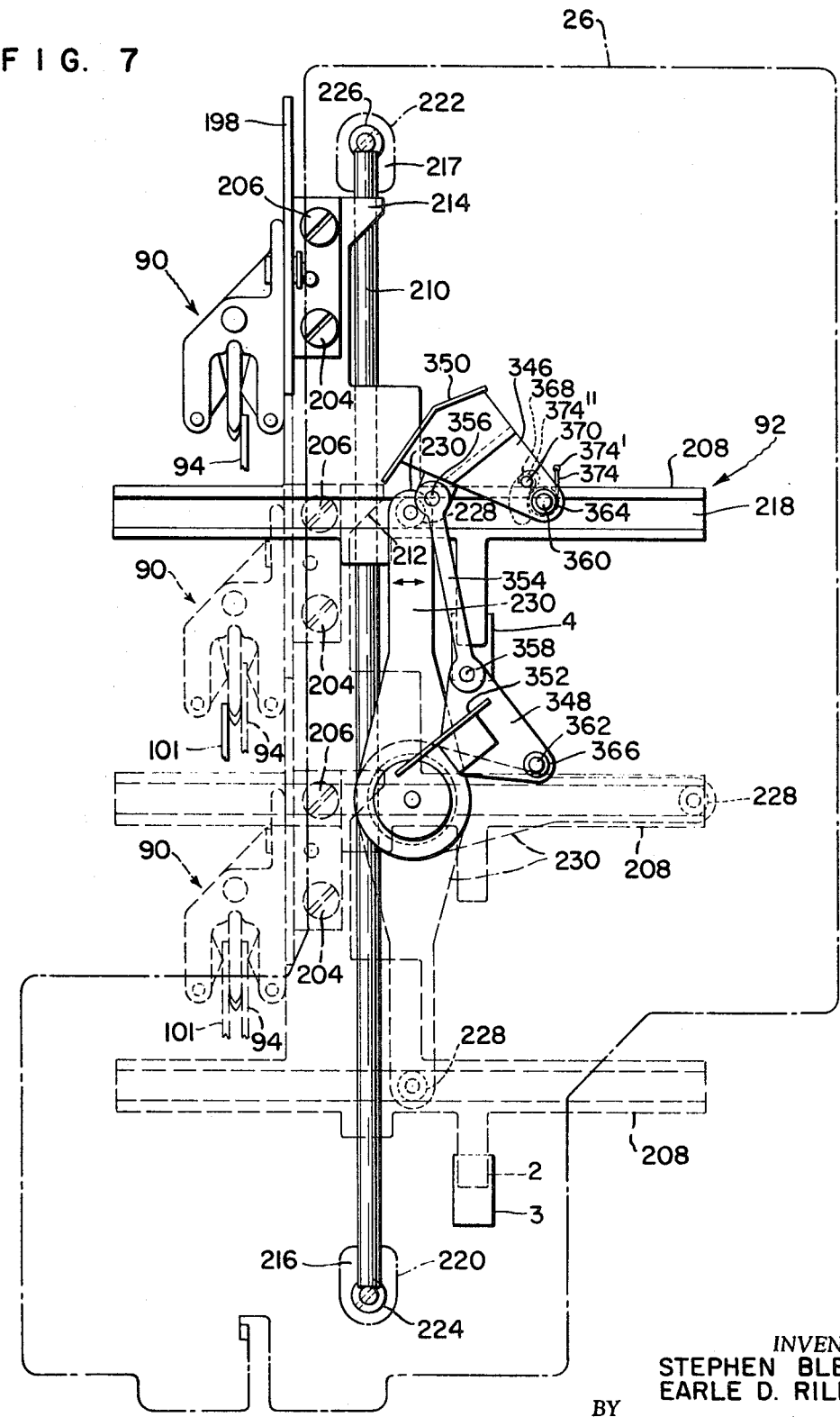

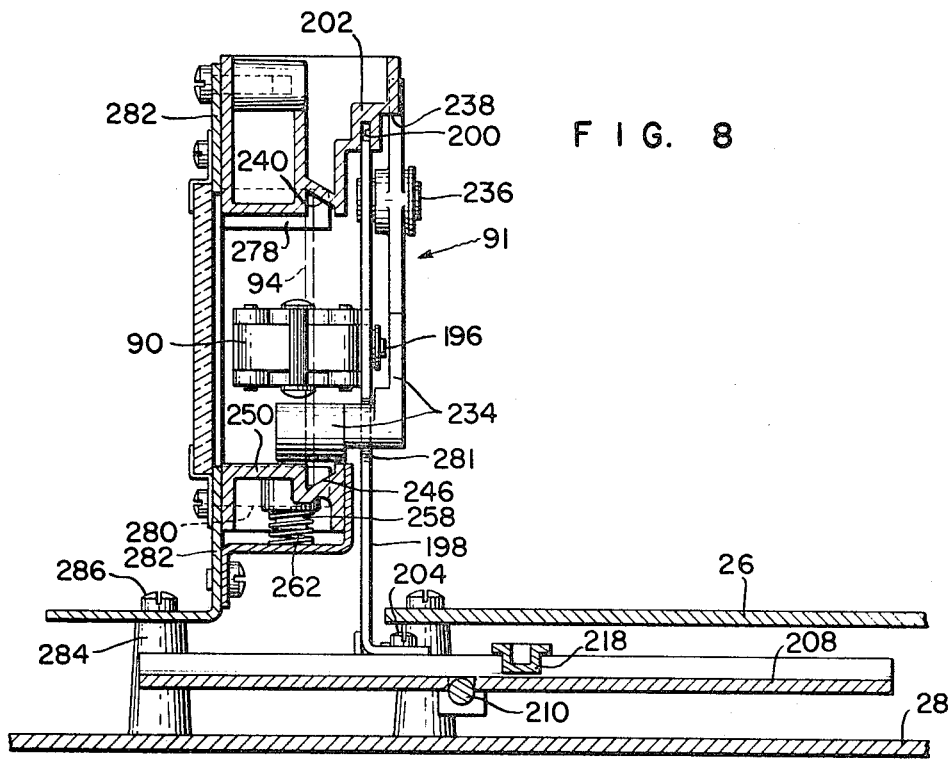
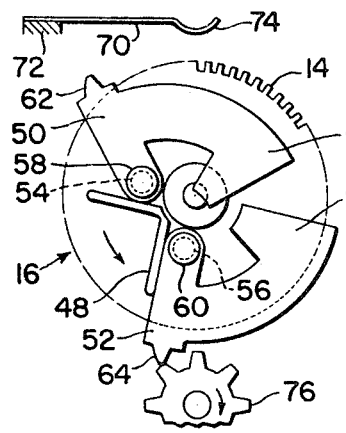
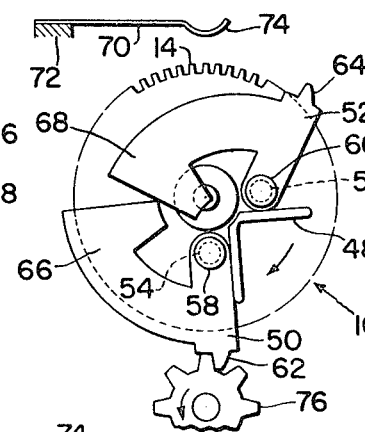
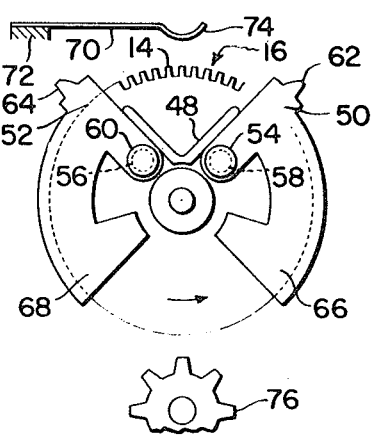
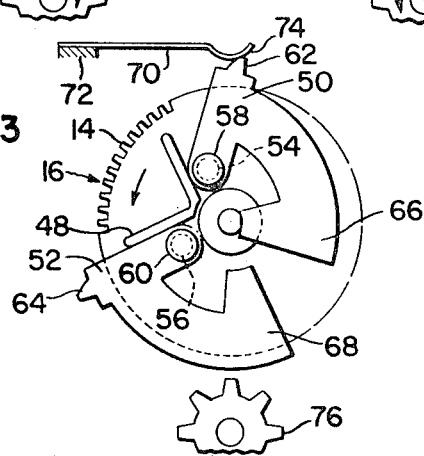

INVENTORS.
STEPHEN BLECHER
EARLE D. RILEY, JR.
BY
John Shaw Stevenson
AGENT.

PATENTED AUG 31 1971 3,602,587

*INVENTORS.*
STEPHEN BLECHER
EARLE D. RILEY JR.

BY *John Shaw Stevenson*

AGENT.

INVENTORS.
STEPHEN BLECHER
BY EARLE D. RILEY, JR.

John Shaw Stevenson
AGENT.

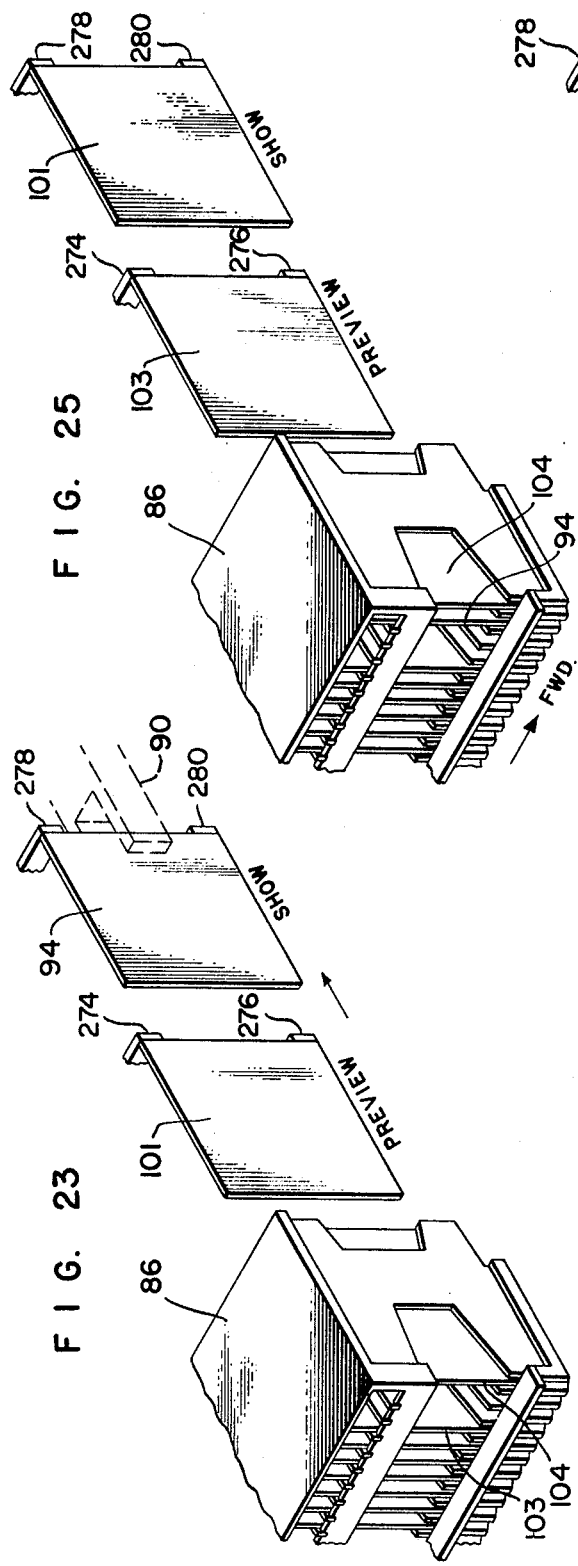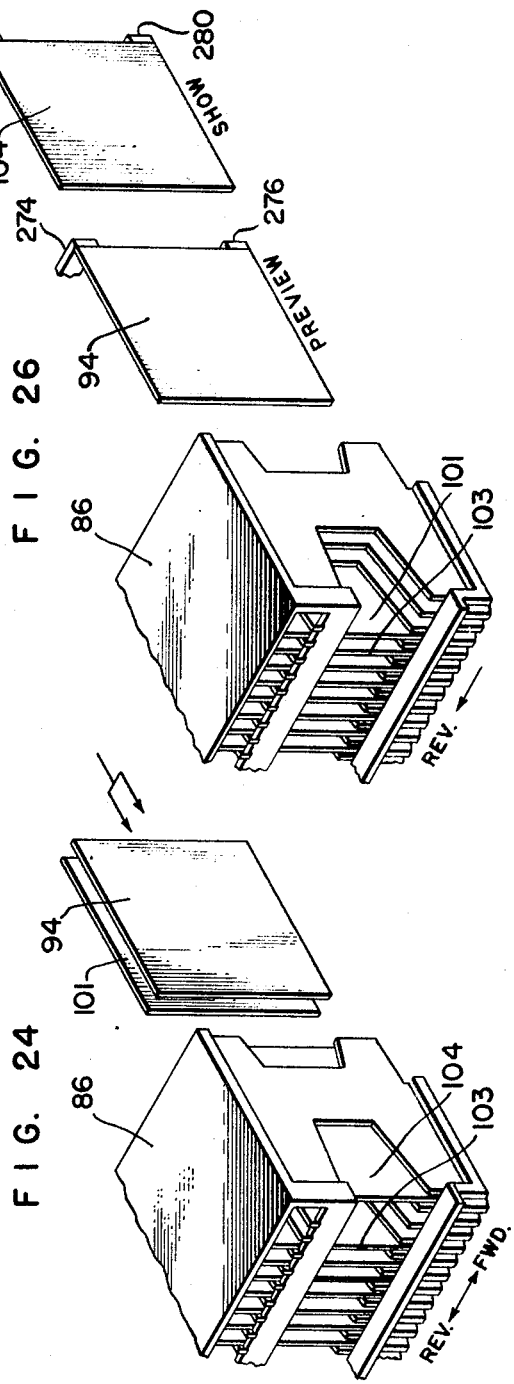

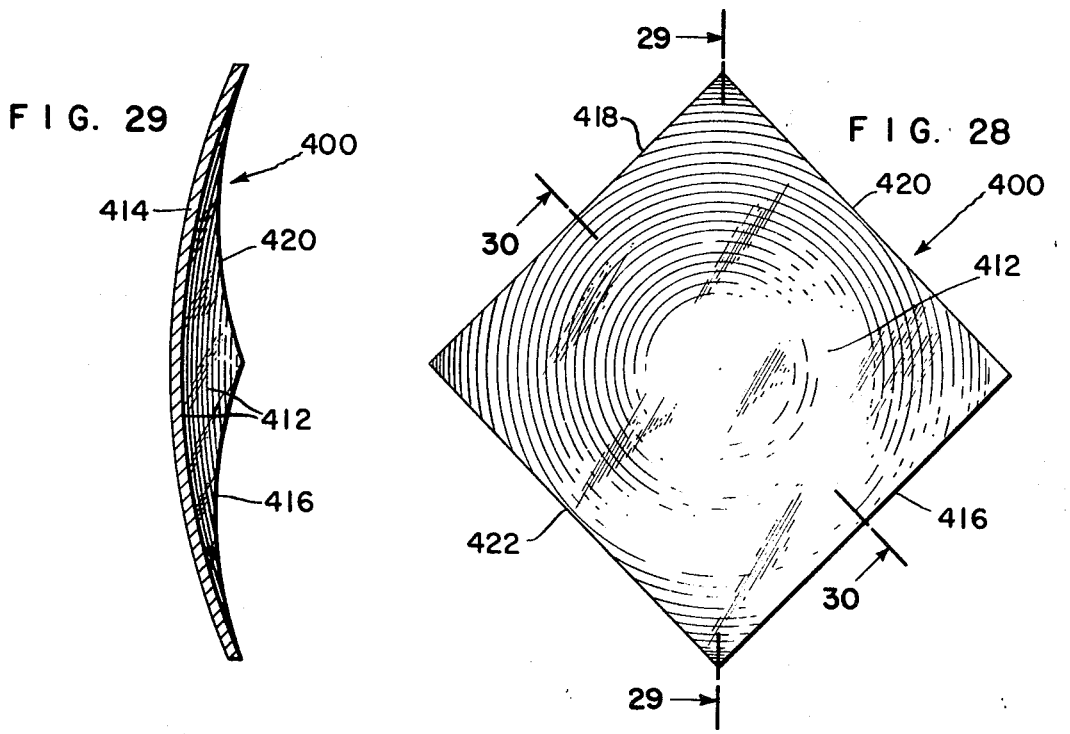
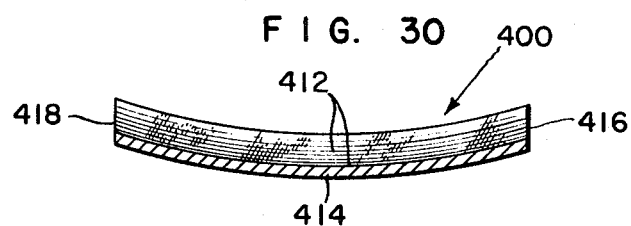
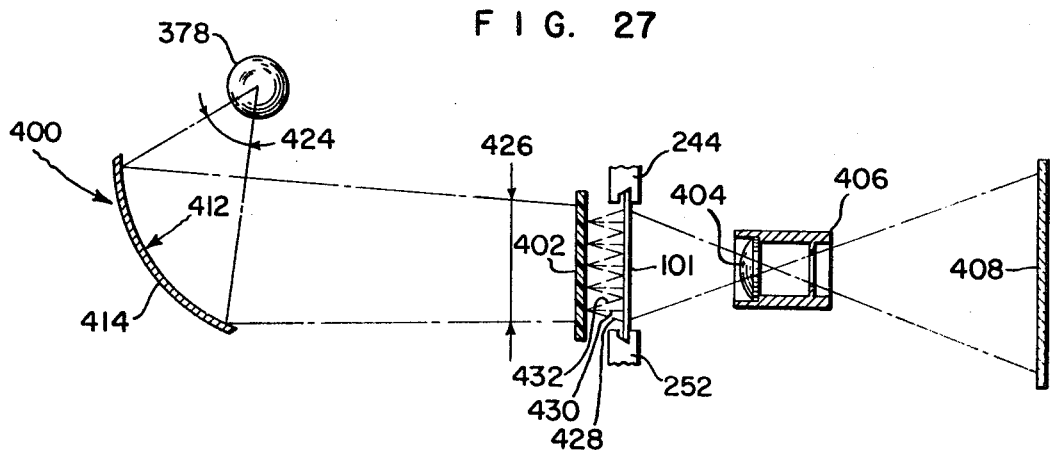

3,602,587

PROJECTING APPARATUS

It is an object of the present invention to disclose a slide actuating apparatus for a slide projector that will more directly and rapidly move slides between a slide tray, a preview and a show position and visa versa then previously available slide actuators.

More specifically it is an object of the present invention to employ a slide actuating apparatus that accomplishes the aforementioned rapid movement of slides in a slide projector by providing a reversible scotch yoke slide drive and a cross plate member thereon that is provided with pusher arm and jaw means for simultaneously moving two slides jointly in a straight line and back and forth between the aforementioned slide tray, preview and show positions.

It is another object of the present invention to disclose a slide actuating means for a projector that is provided with a pair of uniquely constructed slide tracks and pulling jaws that will maintain an exceptionally good fixed spaced apart relationship between adjacent slides of any two bound or unbound thick or thin slides that are mounted in different materials as pairs of these slides are moved directly back and forth between the aforementioned tray, preview and show positions.

More specifically it is another object of the invention to disclose a motor driven gear drive for moving a slide actuating means that simultaneously pushes a pair of slides directly from a tray into a pair of jaws for movement in a straight path to preview and show positions and a cam actuated kicker arm to push the slides out of the jaws back into their original tray positions before the jaws are returned to their original slide receiving positions and thereby enable the tray to be advanced one septum in a forward direction by a slide indexing mechanism and to enable the slide that was previewed to be advanced by the actuating means to the show position and another third slide, that is behind the last mentioned slide, to be simultaneously moved into the preview position.

It is a further object of the present invention to disclose a motor driven gear device for moving a slide actuating means that simultaneously pushes a pair of slides directly from a tray into a pair of jaws for movement in a straight path to preview and show positions and a cam actuated ejector arm to push the slides out of the jaws back into their original slide receiving positions before the jaws are returned to their original slide receiving positions and thereby enable the tray to be moved rearward one septum in a reverse direction by a slide indexing mechanism and to enable the slide that was in the "show" position to be moved by the actuating apparatus to the "preview" position and another fourth slide that is in front of the last mentioned slide in the tray to be simultaneously moved into the "show" position.

A better understanding of the present invention may be had from the following detailed description when read in connection with the accompanying drawings in which:

FIG. 5 is a section on 5—5 of FIG. 4 showing the index pinion in driving contact with a rack formed on the side of the tray;

FIG. 6 is a view taken through the preview position and along the line 6—6 of FIG. 4;

FIG. 7 is a bottom view of FIG. 5 showing how a scotch yoke is employed to move a pair of slide pulling jaws and its two slides in a straight line between the previously mentioned preview and show positions;

FIG. 8 is an elevational view taken along the line 8—8 of FIG. 4;

FIG. 10 shows the position of the indexing apparatus when the slide changing mechanism is driving the tray in a forward direction;

FIG. 11 shows the position of the index apparatus when the slide changing mechanism is driving the tray in a reverse direction from FIG. 10;

FIG. 12 shows the position of the index apparatus when the slide changing mechanism is in the show position;

FIG. 13 shows the position of the indexing apparatus immediately after the direction of the indexing gear has been changed from that shown in FIG. 11 and before the position of the indexing gear has reached the position shown in FIG. 10;

FIG. 23 shows the preview and show position into which two slides are initially positioned by the previously referred slide actuator;

FIG. 24 shows the position of two slides of FIG. 1 just before they are returned to the tray and before the slide tray is indexed in a selected one slide tray compartment length in either a forward or rearward direction;

FIG. 25 shows the new position of the next set of slides after the slides in FIG. 2 have been returned to the tray and the tray has been indexed in a forward direction; and FIG. 26 shows the new position of the next set of slides after the slides in FIG. 2 have been returned to the tray and the tray has been indexed in a reverse direction;

FIG. 27 is a view similar to FIG. 4 but showing the manner in which the characteristically shaped reflector converts a cone of light rings into a square beam of light rays;

FIG. 28 is a view of the square front face of reflector;

FIG. 29 is a view of the reflector taken along the lines 28—29 of FIG. 28; and

FIG. 30 is a view of the reflector taken along the lines 30—30 of FIG. 28.

TRAY INDEXING

Figure 1:
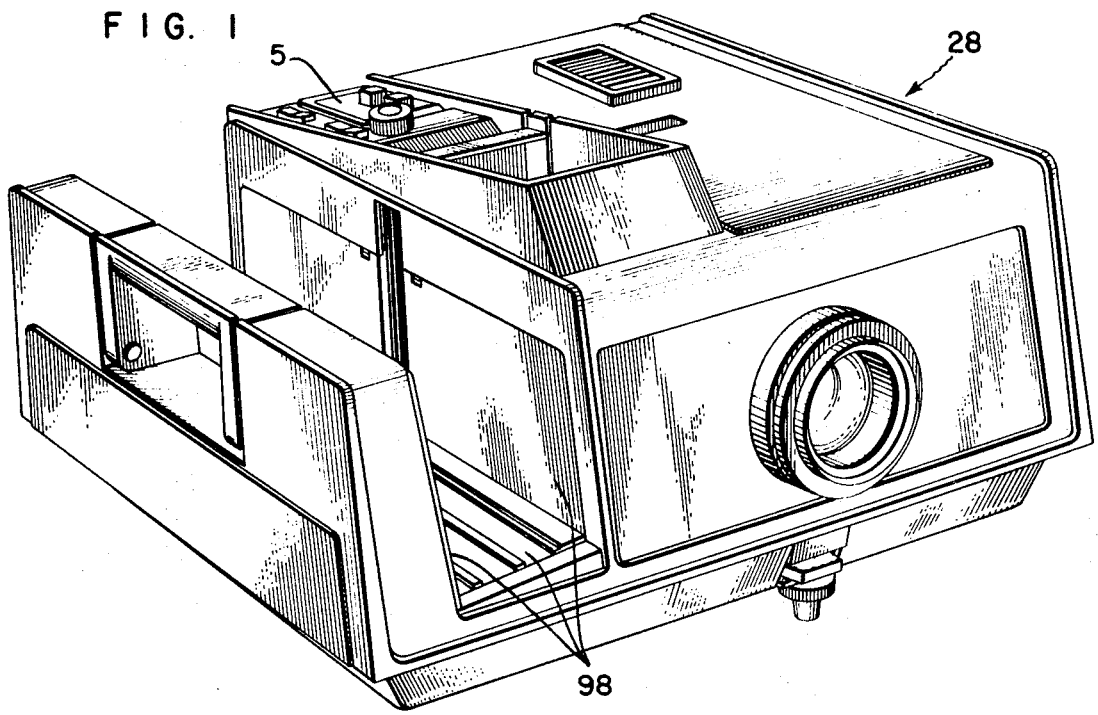
FIG. 1 is an external view of the projector taken from its front left corner and shows its left side, top and front faces.

The tray indexing driving apparatus 10 is comprised of three portions namely a reversible motor driven gear reduction drive 12, an index gear 14 forming a portion of the gear reduction drive and a swingable slide tray indexing means 16 rotatable with the index gear.

The motor driven gear reduction drive 12 is comprised of a reversible motor 18 fixedly supported in a vertical position by means of an inverted U-shaped support bracket 20 and screw connections 22, 24 on the mechanism plate 26 of the slide projector 28.

The reversible motor drive 12 is also comprised of a first pulley 30 fixedly mounted on the motor shaft 32 for rotation therewith, a second pulley 34 mounted for rotation on the plate 26, a reduction belt 36 extending between the pulleys 30, 34, a pinion 38 mounted for rotation with pulley 34 and reduction gears 40, 42 mounted for rotation on plate 26 that are driven by pinion 38.

The drive 12 is also comprised of a crank arm driving gear 44 of a slide changing mechanism mounted for rotation on the plate 26 and driven by pinion 42, and idler gear 46 mounted for rotation on plate 26 and driven by gear 44 that is in driving relation with the index gear 14 which forms a second portion of the tray indexing reduction apparatus 10.

As is best shown in FIG'S 10–13 the swingable indexing means 16 is comprised of a right-angle shaped stop in the form of a protuberance 48 that is integral with and extends away from the top face of the index gear 14, and two index tooth arm members 50, 52. A separate pivoted pin 54; 56 integral with and protruding from the faces of the index gear 14 provides a bearing surface about which each of their associated index tooth arm members 50, 52 can be swung. The outer ends 58, 60 of each of these respective pins 54, 56 are shown peened over to prevent each of these index tooth members from sliding off each of their respective pins 54, 56.

Each of the index tooth members 50, 52 have a single tooth 62, 64 formed on its outer periphery. Each of the index tooth arm members 50, 52 also have a substantially J-shaped extensible portion 66; 68.

FIG'S 4, 10–13 each show a cantilever leaf spring 70 fixedly connected at its left end to a stationary member 72 and having a bowed shaped portion 74 at its outer end that is positioned to engage the teeth 62, 64.

It can also be seen that a tray indexing pinion 76 is mounted by means of a shaft for rotation on the mechanism plate at a position that will enable the tooth 62 to be forced by the stop 48 into driving engagement therewith when the index gear 14 is rotated in the direction indicated by the arrow in FIG. 11.

Figure 4:
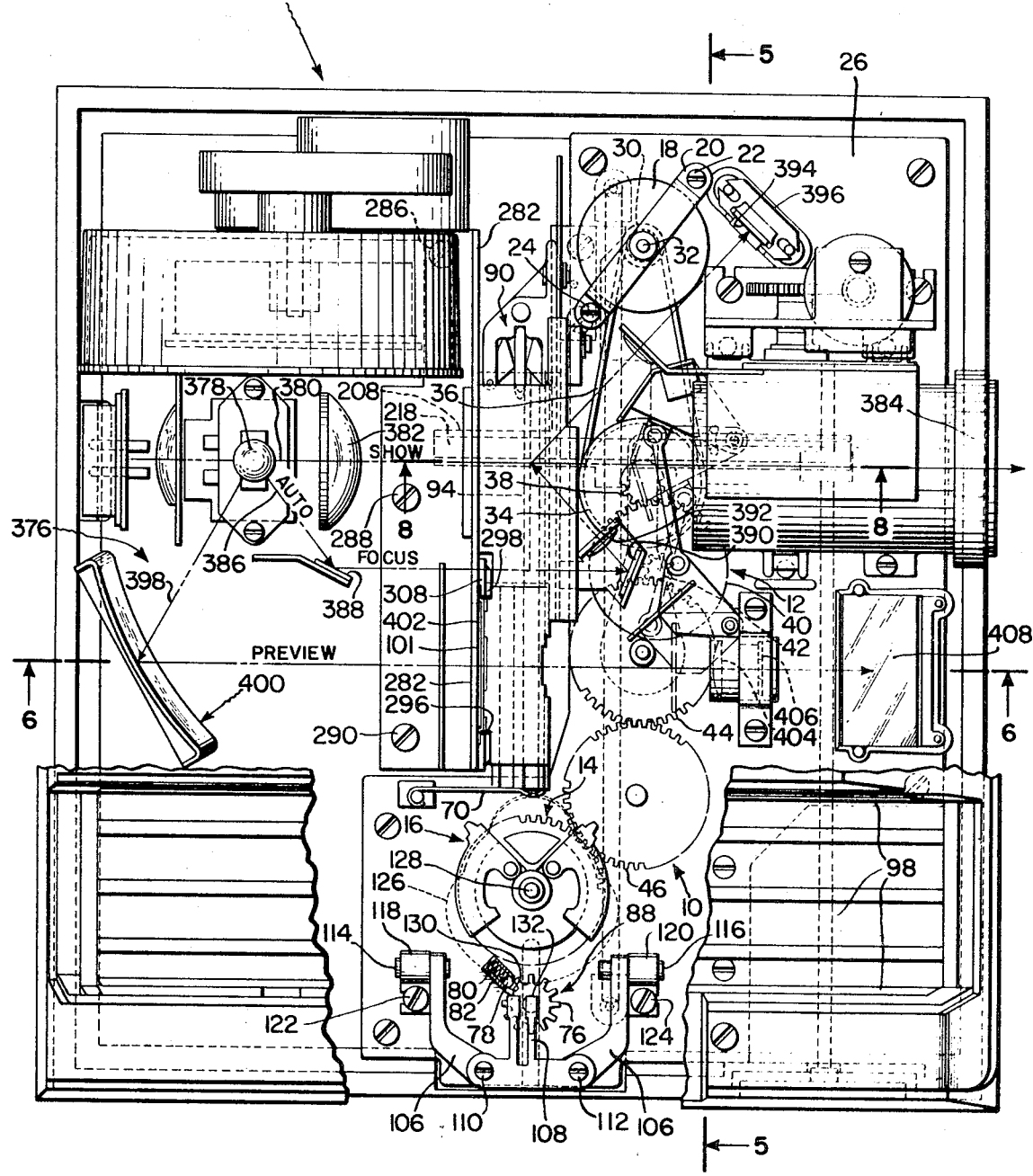
FIG. 4 is a plan view of the projector similar to FIG. 3 but with a portion of the casing removed to reveal the internal driving parts of the slide and index driving mechanism contained therein.

When the shaft 32 of motor 18 is rotated in a counterclockwise direction as viewed in FIG. 4 the pulleys 30, 34 and pinion 38 will be rotated in the same counterclockwise direction, the gear 40 and pinion 42 will be rotated in a clockwise direction, the gear 44 will be rotated in a counterclockwise direction, the gear 46 will be rotated in a clockwise direction and the index gear 14 will be rotated in a counterclockwise direction as shown in FIG. 10.

When this counterclockwise rotation of the motor takes place the forward edge of the index tooth arm member 52 will be forced against stop 48 and the tooth 64 will be brought into engagement with the tray indexing pinion 76 to advance the pinion 76 clockwise by one tooth length for each rotation of the index gear 14.

While this latter action takes place the sphere 78 will initially be forced out of engagement between two adjacent teeth of pinion 76 against the bias of a coil spring 80, that is located within the stationary casing 82 and which mounts the sphere 78 in longitudinal movable engagement therein. The sphere 78 will then be forced to move outward by the movement of the index pinion 76 along the outer surface of the moving tooth and to then drop into the outer space between the tooth with which it has been in contact and its adjacent tooth to precisely maintain the indexing pinion 76 in its new slide tray retaining position.

During each occasion in which the motor 18 is energized a clockwise one tooth length rotation of the index pinion 76 will take place in the manner previously described and will be retained in that position by the spring bias sphere unit 80, 82, 78. It can also be seen that during each one tooth rotation of the index pinion 76 that the rack 84 that is integral with the tray 86 will be advanced the distance of one slide length so that each successive slide can be aligned with slide pushing, slide gripping, slide kicking and slide changing mechanisms 88, 90, 91, 92 associated with a slide 104 in the tray.

When the direction of the motor 18 is reversed so that shaft 32 is rotated in a clockwise direction as viewed in FIG. 4 the pulley 30 and 34 and pinion 38 will be rotated in the same clockwise direction. The gear 40 and pinion 42 will be rotated in a counterclockwise direction. The gear 44 will be rotated in a clockwise direction, the gear 46 will be rotated in a counterclockwise direction and the index gear 14 will be rotated in a clockwise direction as shown in FIG. 11.

When this clockwise direction of the motor takes place the forward edge of the index member 50 will be forced against stop 48 and the tooth 62 will be brought into engagement with the tray indexing pinion 76 to rotate the pinion 76 counterclockwise by one-tooth length for each rotation of the index gear 14.

While the aforementioned action takes place the sphere 78 will be sequentially moved out of and into its slide index retaining position in the same manner as that previously described. It should be noted that while the index gear 14 is being driven in the tray advancing counterclockwise direction as shown in FIG. 10 the tooth member 50 including its substantially J-shaped portion 66 will be free to rotate in a clockwise direction about its pin pivot 54 due to the centrifugal force inherent in this rotating structure.

The tooth 62 of the tooth member 50 will thus be driven past the index pinion 76 while in a retracted position and nondriving position that will prevent it from being brought into driving engagement with pinion 76.

It should also be noted that while the index gear 14 is being rotated in the reverse tray counterclockwise direction as shown in FIG. 11 the tooth member 52 including its substantially J-shaped portion 68 will be free to rotate in a counterclockwise direction about its pin pivot 56 due to the centrifugal force inherent in this rotating structure. The tooth 64 of the tooth member 50 will thus be driven past the index pinion 76 while in a retracted position that will prevent it from being brought into driving engagement with the pinion 76.

FIG. 13 shows the position of the parts of the slide tray indexing means 16 immediately after the motor 18 has been changed from rotation in a counterclockwise direction to a rotation in the clockwise rotation as shown in FIG. 4 and when the index gear 14 is shifted from a counterclockwise rotating position of FIG. 11 to the clockwise rotation positions of FIG. 10 and immediately before it has reached the condition as shown in this FIG. 10.

It can be seen in FIG. 13 that the bowed portion 74 of the cantilever spring 70 is engaging the tooth 64 of the member 50 in order to prevent an additional step driving contact from being made between the tooth 26 and the index pinion 76 while the motor and driven index gear 14 is shifted from the FIG. 11 driving condition to the FIG. 10 driving condition. In this manner reverse tooth driving engagement can take place between 64 and the tray driving index pinion 76 before a single reverse revolution of the index gear 14 has taken place.

In a similar but opposite manner it can be seen that the rotation of the motor driven index gear 14 can be reversed from the counterclockwise direction shown in FIG. 10 to a clockwise direction shown in FIG. 11 within less than one revolution of the index gear 14. This is accomplished when the bowed area 74 of leaf spring 70 engages tooth 62 and forces it against the stop 48 a short time after the direction of rotation of the motor 18 and index gear 14 is changed to a direction opposite that shown in FIG. 10 and before the position shown in FIG. 11 is reached.

When a reverse counterclockwise rotation of the index gear 14 to that shown in FIG. 11 occurs the tooth 62 will engage the bowed portion 74 of the leaf spring 70 and this will cause the end of the other J-shaped portion 68 to retain the tooth member 52 against the stop 48. This construction is beneficial because it minimizes the split second time it will take to effect a one tooth step rotation of the index pinion 76 and the tray 86 as shown in FIG. 11 immediately after the direction of the motor 18 has been reversed from the driving direction shown in FIG. 11.

In a similar manner it can be seen that when a reverse clockwise location of the index gear 14 to that shown in FIG. 10 occurs the tooth 64 will engage the bowed portions 74 of the leaf spring 70 and thus will cause the end of the J-shaped portion 68 to swing into contact with the other J-shaped portion 66 to retain the tooth member 50 against the stop 48. This structure is also beneficial because it minimizes the split second time it will take to affect a one tooth step rotation of the index pinion 76 and tray 86 from that shown in FIG. 10 immediately after the direction of the motor 18 has been reversed from the driving direction shown in FIG. 10.

During either the time between successive engagements of the tooth 64 with the pinion 76 gripping shown in FIG. 10 or the time between successive engagements of the tooth 62 with the pinion 78 as shown in FIG. 11 a slide in the tray is moved from the tray into a "show" or a projecting position in the projector for viewing on an edit screen 408 for a preselected period of time in which the motor ceases to rotate. During this time in which the slide is being shown or projected the parts of the slide tray indexing means 16 will be in the position shown in FIG. 12.

MECHANISMS FOR PUSHING, GRIPPING, KICKING AND CHANGING SLIDES

The projector 28 shown in FIGS. 1–5 is provided with a wall portion 98 which forms a rectangular recess to accommodate the insertion of a tray 86 therein as is best shown in FIG. 5.

Pairs of e.g. the slides 94, 101, 103, 104 are moved from their in tray, 86, position into their respective preview and show positions by means of a slide pushing mechanism 88. The mechanism 88 is constructed of two rocker pusher arm members 106, 108 that form a substantially C-shaped configuration and which are joined together by screw connections 110, 112.

The rocker pusher arm 106, 108 has pivot pins 114, 116 that are mounted for pivotal movement in a clockwise and counterclockwise direction in associated stationary bearing numbers 118, 120. These arm bearing numbers 118, 120 are in turn fixedly connected by screw means 122, 124 to a stationary mechanism plate 26.

As is best shown in FIG. 5 the lower end of the rocker pusher arm 108 is of a preselected shape so that rotary movement of the cam 126, with which it is in physical surface to surface contact, will cause the pusher arm 106, 108 to be rocked on its bearing members 118, 120 for movement between its solid line outside tray position to its dotted line inside tray position.

This pusher actuator cam 126 is mounted on a shaft 128 that passes through the mechanism plate 26. The other end of this shaft 128 is fixedly connected to the previously mentioned index gear 14 for rotation therewith. The index gear 14, shaft 128 and the cam 126 mounted thereon are all supported for joint rotation on the mechanism plate 26.

When a high point of the cam 126 comes into contact with the lower end portion 126 of the pusher arm it will move its upper slide pushing ends 130, 132 from an outside tray position towards slide supporting part in the tray against the edge of two slides 101, 94 therein to push them simultaneously out of the tray into the slide gripping mechanism 90. This action is best shown at the left end position of FIGS. 5 and 7.

Figure 9:
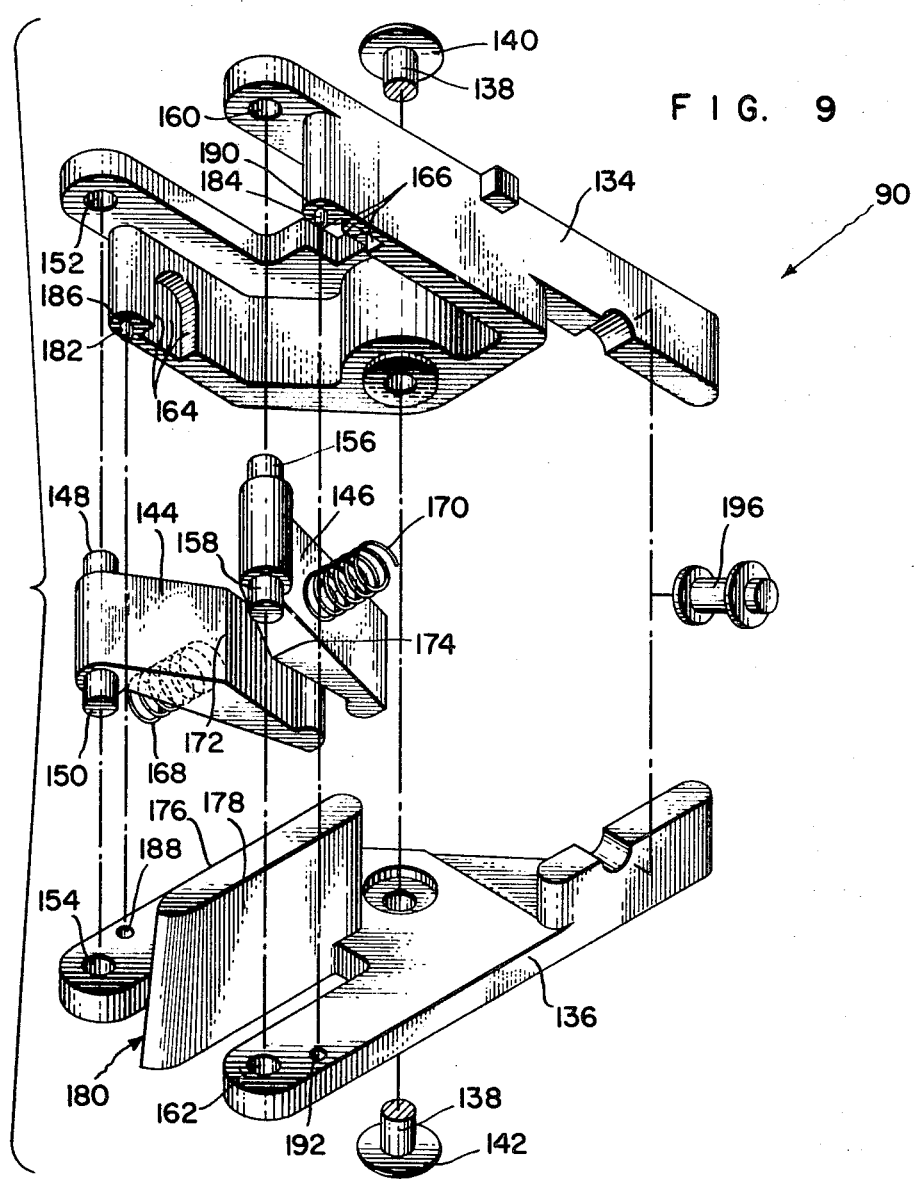
FIG. 9 is an exploded view of the parts employed for the slide gripping jaws shown in FIG. 7.
Figure 22:
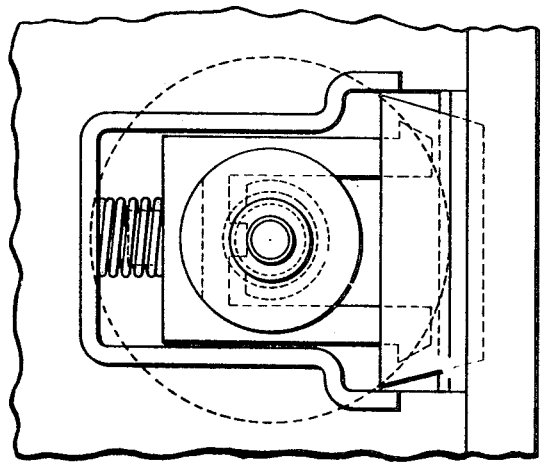
FIG. 22 is a plan view of the latch used to release or retain the front support leg of the projector shown in FIGS. 1 and 6.
Figure 16:
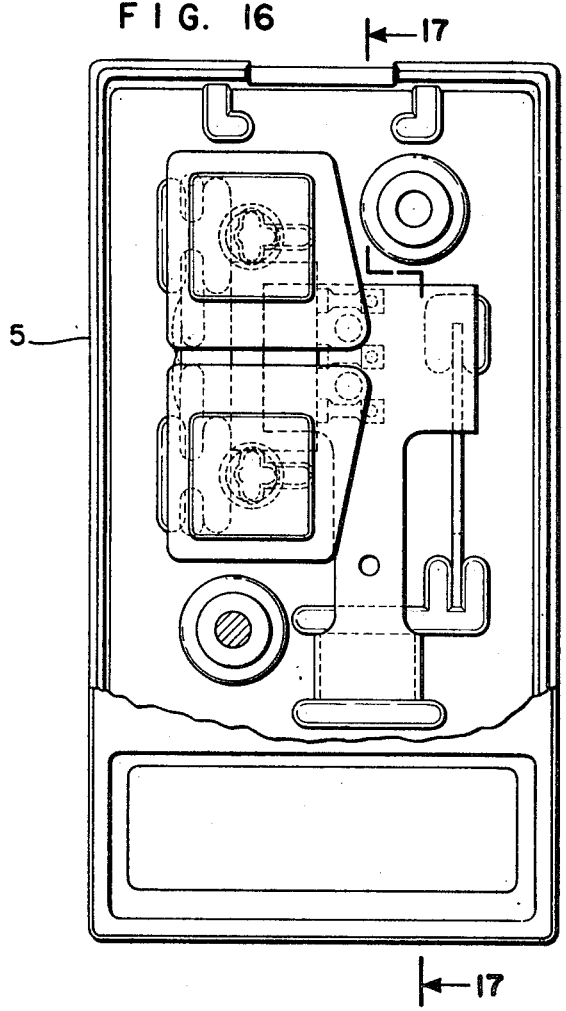
FIG. 16 is a top plan view of a removable pushbutton control hand piece 5 as shown in FIGS. 1–3 for controlling the operation of the projector.
Figure 17:
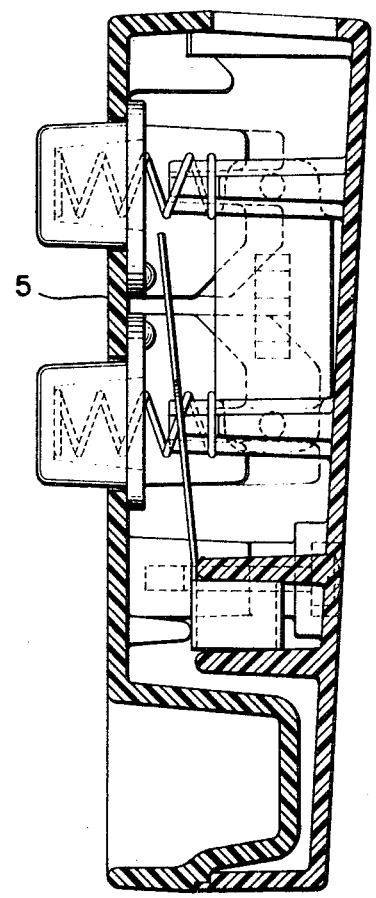
FIG. 17 is a cross-sectional elevation of the hand piece taken along the lines 17—17 of FIG. 16.
Figure 15:
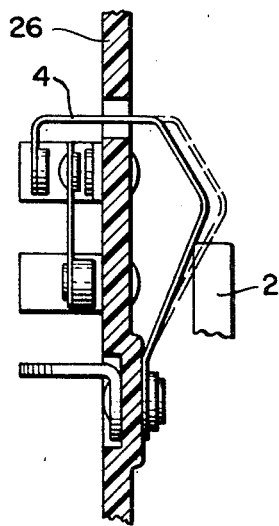
FIG. 15 shows a more detailed view than that shown in FIG. 7 of how a part of a crank slider portion 2 of the scotch yoke engages another switch 4 at another end of its travel.
Figure 14:
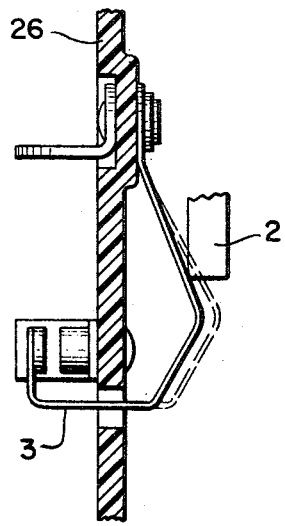
FIG. 14 shows a more detailed view than that shown in FIG. 7 of how a part of a crank slider portion 2 of a scotch yoke engages a first switch 3 at one end of its travel.
Figure 18:
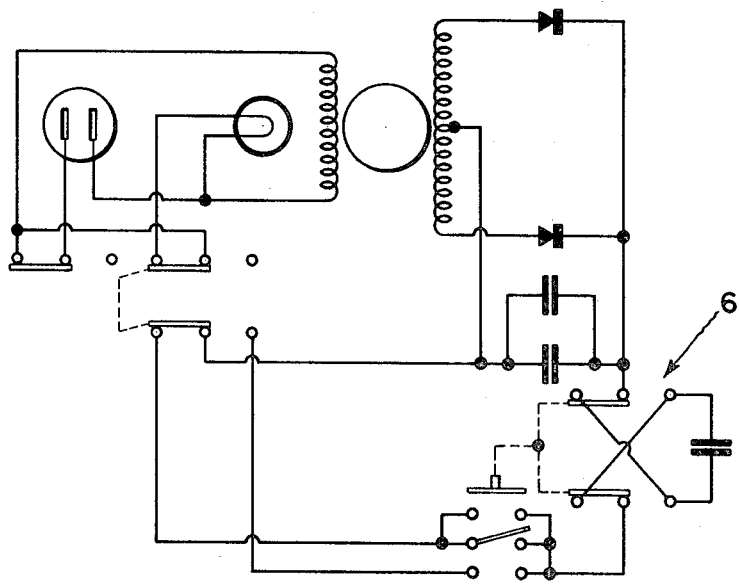
FIG. 18 shows one form of a manually operated switch 6 for changing slides in the projector.

As is best seen in FIGS. 7 and 9 the gripping mechanism 90 is comprised of upper and lower portions 134, 136 that are joined together as an integral unit by means of a connecting rod 138 that in turn has peened over portions 140, 142 at its outer ends to retain a pair of jaws 144, 146 therein. One of the jaw portions 144 has a set of pins 148, 150 pivotally mounting it in the walls 152, 154 formed in the upper and lower portion 134, 136.

The other jaw portion 146 also has a set of pins 156, 158 for pivotally mounting it in the walls 160, 162 formed in the upper and lower portions 134, 136.

The upper and lower portions 134, 136 also have wall portions 164, 166 forming slots to accommodate the insertion of one end of their associated springs 168; 170 therein. The other end of each of these springs 168, 170 are engaged with their respective jaw portions 144, 146 to apply a biasing force thereto and to force their gripping edges 172, 174 toward one another and into engagement against opposite side surfaces 176, 178 of a slide separating member 180.

A pair of rods 182, 184 extending between recessed walls 186, 188; 190, 192 in the upper and lower portions 134, 136 are employed to restrict the degree of motion to which each jaw portion 144, 146 is allowed to swing in an outward direction.

As is best shown in FIGS. 5, 8 and 9 the aforementioned gripping mechanism 90 is integrally mounted by means of retaining pin 196 on a cross plate 198 for movement therewith. The cross plate 198 in turn is of an L-shaped configuration having its upper end in slidable engagement with a groove 200 formed in an upper right side portion of the slide guide 202.

As is best shown in FIGS. 7 and 8 the lower end of the cross plate 198 is fixedly connected by screw connections 204, 206 to a crank slider 208 for movement therewith in a straight line along a shaft 210. Two bearing portions 212, 214 are formed on the crank slider 208 in order to accommodate its aforementioned straight line movement along the shaft 210.

The opposite ends of shaft 210 are fixedly retained in the channel portions 216, 217 of support members 220, 222 which form a part of the mechanism plate by the heads of the screw retaining means 224, 226 that are threadedly connected in tight relationship to the mechanism plate 26.

The crank glider 208 which is slidably mounted on shaft 210 is also comprised of a channel portion 218 into which a cylindrically shaped driving pin 228, mounted on one end of the crank arm 230, is slidably engaged.

The other end of the crank arm 230 is mounted on a shaft 232 which passes through the mechanism plate 26. The other end of this shaft 232 in turn is mounted on the previously mentioned crank drive gear 44 for rotation therewith on the mechanism plate 26.

It can be seen from the aforementioned description of the slide changing mechanism 92 that rotation of the reversible motor 18 in a clockwise direction as viewed in FIG. 5 will cause the pulleys 30, 34, belt 36 and pinion 38 to rotate in a clockwise direction, the gear 40 and pinion 42 to rotate in a clockwise direction, and the crank gear 44 and its associated drive shaft 232, crank arm 230, and drive pin 228 to be driven in a clockwise direction.

After the previously described slide gripping mechanism 90 has moved the slide 94 into its show position and is thereafter moved out of gripping engagement with the right bound edge 234 of this slide 94 as shown in solid line form in FIG. 7 the crank arm 230 and the drive pin 228 is thereafter rotated in a clockwise direction as previously described.

Figure 20:
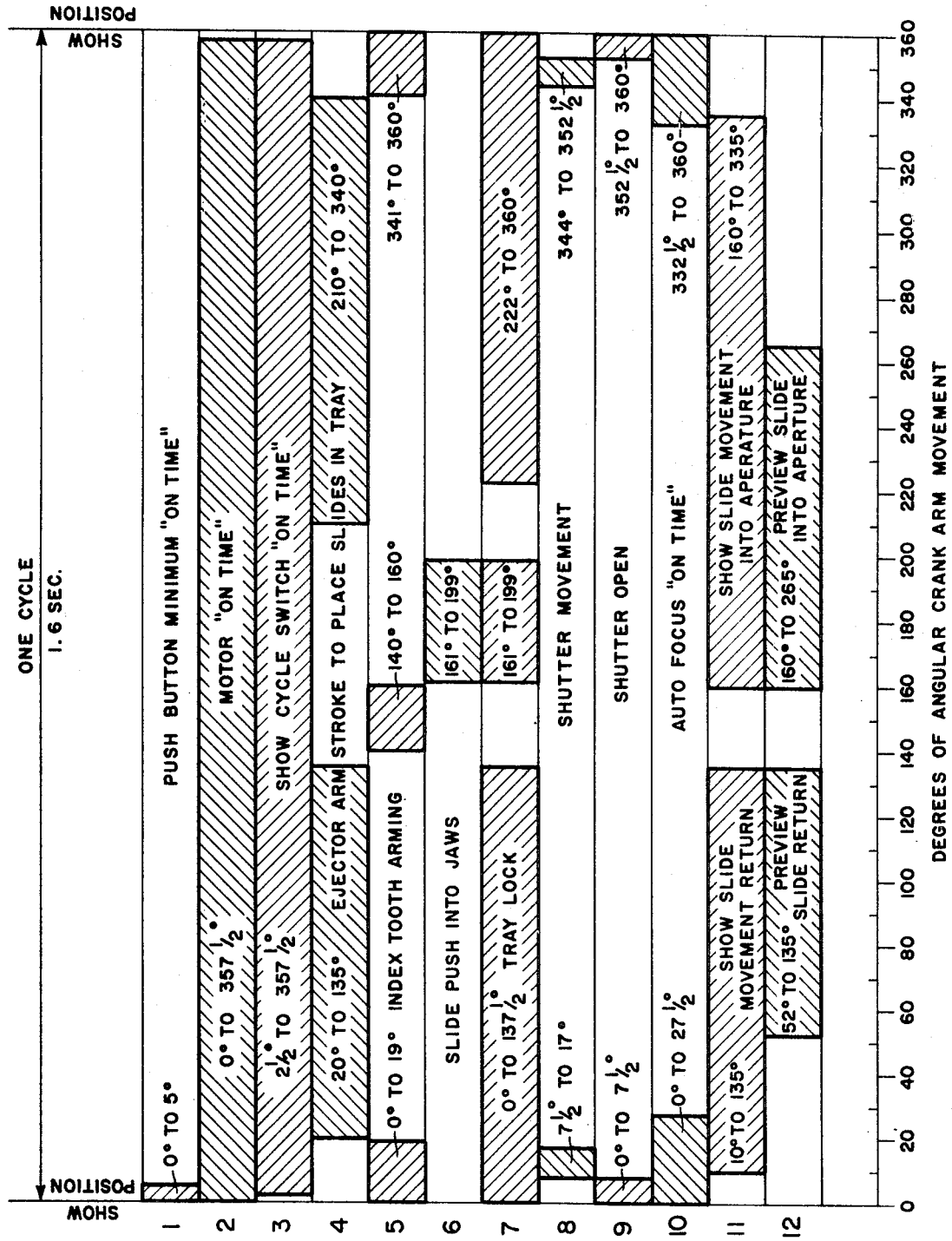
FIG. 20 shows in cross hatch form what parts are activated and for what time duration during one complete slide show position to slide shown position during a 360° rotary movement of a crank arm that is employed in a scotch yoke slide tray indexing and slide changing driving mechanism.
Figure 21:
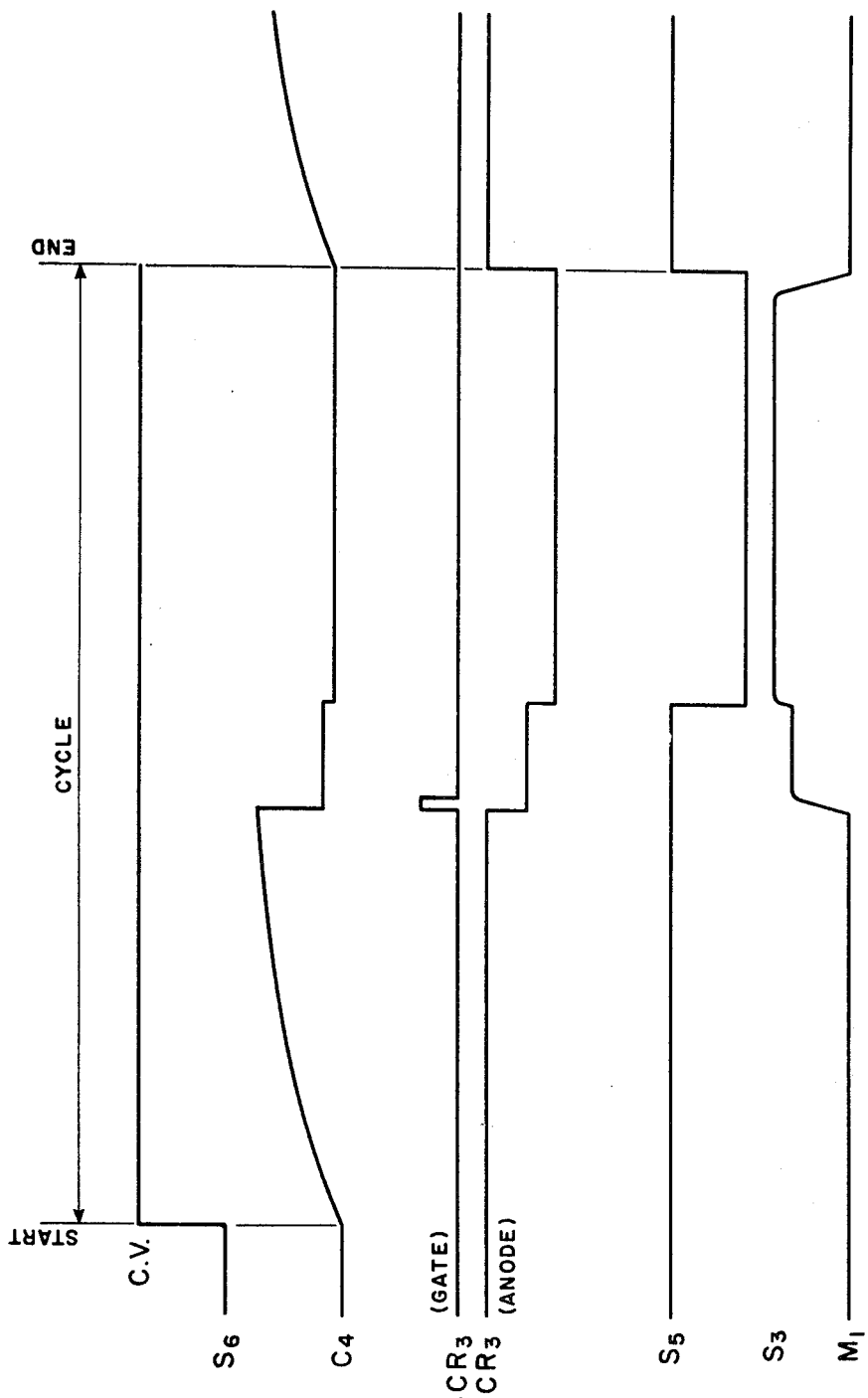
FIG. 21 is a view showing how changes in voltage of the timer employed in the circuit shown in FIG. 19 take place with respect to time during one complete cycle of operation of the projector.

This action will cause the crank slider 218, the cross plate 198 and the gripping mechanism 90 to move through their dotted line preview positions to their extreme left dotted line slide pickup positions during the first one-half of the show position to show position cycle shown in FIG. 20.

It can e.g. be seen from FIG. 20 that slide movement return from show position to the tray will start to take place after 10° of clockwise crank arm rotation from its solid line position in FIG. 7 occurs. FIG. 20 also shows that after 10° of movement of the gripping mechanism 90 has taken place or in other words after 20° of clockwise angular rotation of crank arm 230 from its solid line show position has been accomplished the top of the portion of the ejector arm 234 of the mechanism 91 which is pivoted by means of pin 236 on cross plate 198 will commence to engage an ejector cam 238 on top of slide guide 202. This action will jointly push this slide 94 that was in the show position and then this slide 94 along with the slide 101 that was in the preview position jointly back into the tray 86. This tray return action will take place before the motor driven crank arm 230, crank slider 208 and cross plate 198 move the gripping mechanism 90 into its dotted left end position shown in FIG. 7.

The aforementioned condition is a time saving device because it enables the previously described indexing of the tray to take place before the gripping mechanism 90 has returned to a position for receiving the next set of slides as shown in dash line form at the left end of FIG. 5.

It should be noted that as the slide 94 is being returned in the aforementioned manner from its show position that its upper marginal edge portion will slide along the tapered slide track surfaces 240 and 242 formed in its associated top slide guide 202 and 244 and its bottom marginal portions will simultaneously be slid along the tapered slide track surfaces 246, 248 formed in its associated bottom slide guides 250, 252.

Also it should be understood that as the slide 101 is being returned in the aforementioned manner from its preview position that its upper marginal edge portion will slide along the tapered top and bottom slide track surfaces 254, 256 in its associated top and bottom slide guides 244, 252.

Each of the bottom slide guides 250, 252 have and are supported by embossed portions 258, 260 extending into an associated coil spring 262; 264 that is grounded against supports 266, 268. These springs 262, 264 are employed to bias the track portions 246, 248, 256 of the guide 252 in an upward direction against the lower edge of the respective slides 94, 101.

Because the tracks 246, 256, and 248 are tapered and because the bottom slide guide 250, 252 can be moved in a downward direction to accommodate different size slides this construction will enable these tracks to receive bound, unbound thick or thin slides that are mounted in different materials and to handle any of the expeditiously as they are moved by the aforementioned slide changing mechanism 92.

The back marginal surface of the slide 94 and the front marginal surface of the slide 101 are always kept in contact with the respective opposite front and back surfaces of the slide separating track portions 270, 272. Since these tracks 270, 272 are aligned with and of the same thickness as the slide separating member 180 of the gripping mechanism this construction is unique in that it will always maintain a good fixed spaced apart relationship between any two adjacent slides, for example, slides 94, 101 when these slides are moved into and out of the tray 86 from and to their preview and show positions.

After the slides 94, 101 have been ejected back into the tray 86 by the ejector arm 234 and the gripping mechanism 90 has returned to its dotted slide reviewing position shown at the left side in FIG. 5 the slide tray 86 will be simultaneously indexed one septum in e.g. a forward direction. The cam 126 will then move the slide pushing in 132 of pusher arm 106, 108 from its solid line out of tray position into its dotted line in tray position and the slide 101 will be pushed between one side of the slide separating member 180 and the jaw gripping edge 174 of the gripping mechanism 90.

While the aforementioned action takes place the slide 103 will also be simultaneously pushed between the other side of the slide separating member 180 and the jaw gripping edge 172 of the gripping mechanism 90 by the slide pushing end 130.

The motor-pulley belt gear crank arm drive 18, 30, 36, 34, 38, 40, 42, 44, 232, 228 will then drive the crank slider 92, the cross plate 198 and gripping mechanism 90 mounted thereon from their extreme dotted line position shown at the left side of FIG. 7 to the right and to their next dotted line preview position where the marginal edges of the slide 103 will hit the stationary stops 274, 276 and will thereby be wiped out of its position between jaws 144 and slide separating mechanism 180.

The slide gripping mechanism 90 continues without stopping to and through the show position to its solid line position shown at the right end of FIG. 7.

While the slide 101 is moved by the slide gripping mechanism 90 into its correct show position its right end will hit the stationary stops 278, 280 and will be wiped out of its position between jaw 146 and slide separator member 180. When the slide gripping member is brought out of gripping relation with the slide 101 and placed in its solid line position as shown in FIG. 7 the second half of the previously referred to 360° crank arm show position cycle will be completed as is shown in the timing graph of FIG. 20.

While the slide gripping mechanism 90 is moving the slides 103 and 101 into their respective preview and show positions the top end of the ejector arm 234 will be forced into engagement with the stationary ejector cam 238 and this will cause the arm 234 to rotate about its pivot pin 236 that is mounted on the cross plate 198. As this rotation takes place a lower end portion 234 of the ejector arm will be forced into a curved slotted out wall portion 281 formed in the cross plate to accommodate this ejector arm movement. The aforementioned construction thus allows a lower end portion 234 of the slide ejector mechanism 91 to be rotated counterclockwise clear of and to the right of the slides 103, 101 and slide gripping mechanism 90.

It should be understood that when the motor 18 is reversed that the tray will be indexed one septum at a time in a reverse manner to that just described.

After the slides 101, 94 are returned to the tray in the manner previously described and the tray is moved one septum in a reverse direction as shown in FIG. 24 the next two slides that will be pushed from the tray into the slide gripping mechanism 90 for movement into the preview and show positions will be the slides 94 and 104 as shown in FIG. 26.

It should also be noted that an aperture plate 282 is supported on an embossed base portion 284 of the projector 28 by means of a suitable number of screw connections 286, 288, 290 in the manner shown for one of these screw connections 286 as shown in FIG. 8.

The aperture plate 282 has a first inner edit plate wall portion 292 that forms a square-shaped aperture for surrounding the marginal surfaces of a slide such as a slide 101 when this slide 101 is moved into a preview position by the gripping and slide changing mechanisms 90, 92 as shown in FIG. 5.

The aperture plate 282 has a second inner wall portion 294 that forms a square-shaped aperture that surrounds marginal surfaces of a slide such as the slide 94 when this slide 94 is moved into a show position by the gripping and slide changing mechanism 90, 92 as shown in FIG. 5.

As is best shown in FIG. 5 the aperture plate 282 has a pair of spaced apart vertical tracks 296, 298 fixedly attached thereto by means of their respective screw connections 300, 302, 303; 304, 306.

A rectangular substantially U-shaped edit plate 308 is shown in a position in which its elongated axis is in a vertical plane and its opposite side edge portions are retained for vertical movement in opposite inner marginal portions of each of the vertically positioned tracks at 296, 298.

The previously referred to top slide guide 244 is fixedly connected through the use of protuberances 310, 312 mounted thereon that are forced into associated wall portion 314, 316 that form apertures in the edit plate 308.

Mounted on the top slide guide 244 is a handle 318 having an upper finger grasping portion that is of an I-beam shaped configuration. The lower portion of this handle 318 is connected to the edit plate 308 by suitable rivot connections 320 and 322.

The previously referred to spring support 268 located at the bottom slide and a guide 252 in FIGS. 5 and 7 is fixedly attached by screw connections 324, 326 to the movable edit plate 308. The left side of the bottom slide guide 252 has two embossed portions 328 and 330 thereon that slidably fit into associated slots 332 and 334 formed in the edit plate 308 in order to allow movement of the bottom slide guide in a vertical up and down direction to and away from its top slide guide 244 when accommodating the previously discussed different size, bound and unbound, thick or thin slides.

FIG. 5 also shows a similar pair of spaced apart portions 336, 338 employed in the bottom show slide guide 250 and slotted wall portions 340, 342 into which the embossed portions are slidably engaged in a vertical direction for the same purpose as that just described for the bottom preview slide guide 252.

From the description of the slide editing apparatus it can be seen that a slide has been placed in the preview position can be removed by grasping and pulling the handle 318 from its lowermost solid line position shown in FIG. 6 in an upward direction through its dotted line position until either end of the tracks 252 is above the top of the edit wall 344. In this last mentioned position the slide can be readily removed by grasping a marginal edge thereof between the fingers and sliding it out either side of the slide track 252.

SHUTTER

FIGS. 4 and 7 shows two shutter arms 346 and 348 having associated shutter blades 350 and 352 integrally connected thereto. A connecting rod 354 and pin connection 356 and 358 are shown interconnecting the second of these shutter arms 348 for joint movement with the shutter arms 346. Each shutter arm is mounted by means of a pivot pin 360, 362 in apertured wall bearing portions 364, 366 formed in the mechanism plate 26 to rotate clockwise and counterclockwise on this mechanism plate 26.

FIG. 7 shows that an arcuate sidewall 368 is formed in the mechanism plate 26 adjacent the pivot pin 360 of the first shutter arm 346 and that a protuberance 370 that is integral with this arm 346 protrudes downwardly from the arm through the slotted wall 368.

A coil spring 374 is shown wrapped around the pin 360 and grounded at one end 374' to the mechanism plate and positioned at its other end 374' in spring biased engagement with protuberance 370 to keep the protuberance 370 at the left end of the slotted wall 368 so that the first shutter arm 346 is biased in a closed direction to the left of the position shown in FIG. 7.

Since the second shutter arm 348 is connected for movement with the first shutter arm the second arm will likewise be retained in a position that is closed and to the left of that shown in FIG. 7.

When the slide arm 218 of the scotch yoke slide actuating mechanism 92 is moved from its left dotted line position to its right solid line position it can be seen that the right side of the slider 218 will hit the protuberance and move it towards the right end of the arcuate slot 370. This action will cause the shutter blades 350, 352 to be simultaneously moved away from their closed position in front of the preview and show apertures 290 and 294 formed in the aperture plate 282 shown in FIG. 5 so that light can pass through the slides e.g. 101 and 94 in the timed manner as shown in FIG. 20.

PREVIEWING APPARATUS

A first one of the component parts that are employed in the light transmitting apparatus 376 of the slide projector 28 is a light source 378 which may be any one of a number of different commercially available varieties but which is preferably of a T-6 clear quartz construction.

This light source 378 is employed to transmit light rays, for example ray 380, emitted therefrom through lens 382, a transparency 94 that is in a show position, through a focusing lens 384 onto a screen, not shown, which is located outside the projector 28.

The light source 378 is also employed to transmit a second set of light rays, for example ray 386, emitted therefrom in series against light reflecting mirrors 388, 390 through lens against the outer surface of the transparency 94 in the show position onto a light sensitive element 394 of an automatic focusing unit 396.

The light source 278 is also employed to transmit a third set of light rays, for example ray 398, emitted therefrom in series against a characterized spherical reflector 400 through a diffusing plate 402 and as diffused light through the second transparency 101 that is retained in preview guides 244, 252, through which the slide changing mechanism 92 shown in FIG. 9 moves the gripping mechanism 90. The diffuser 402 is preferably made of a polyester sheet material which is made from a reaction between ethylene glycol and terepthelic acid, commonly referred to in the trade as MYLAR.

Figure 2:
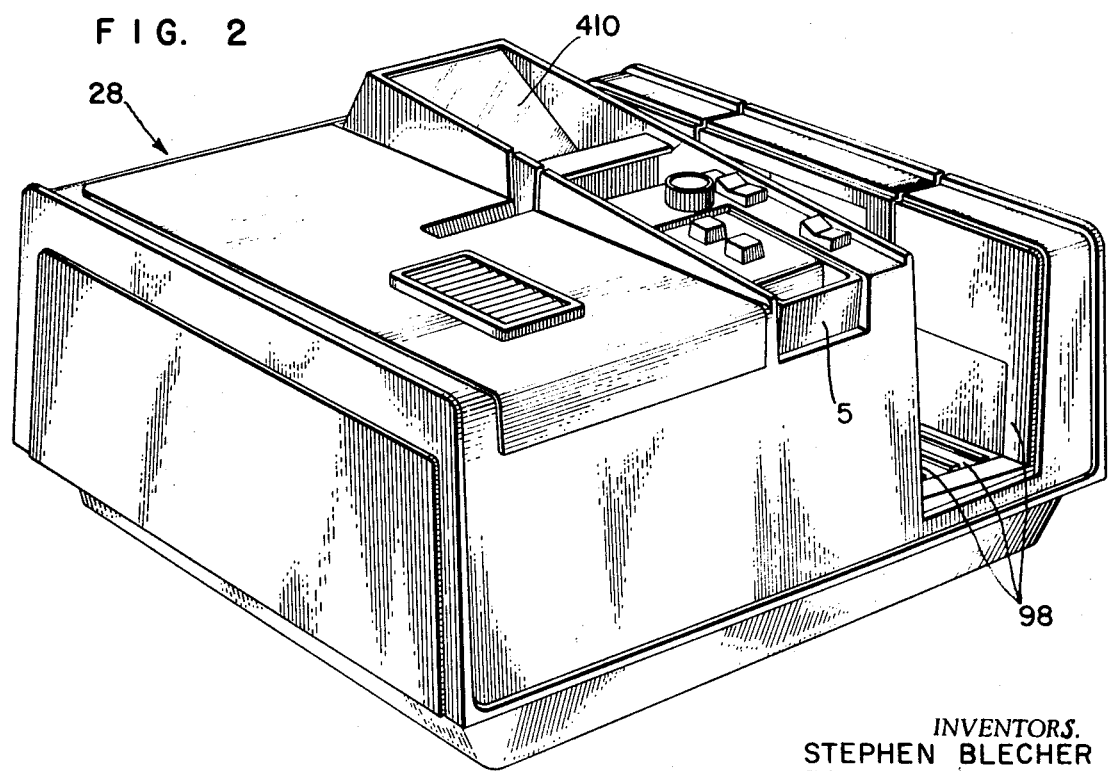
FIG. 2 is an external view of the projector taken from its rear right corner and shows its right side, top and rear faces.
Figure 3:
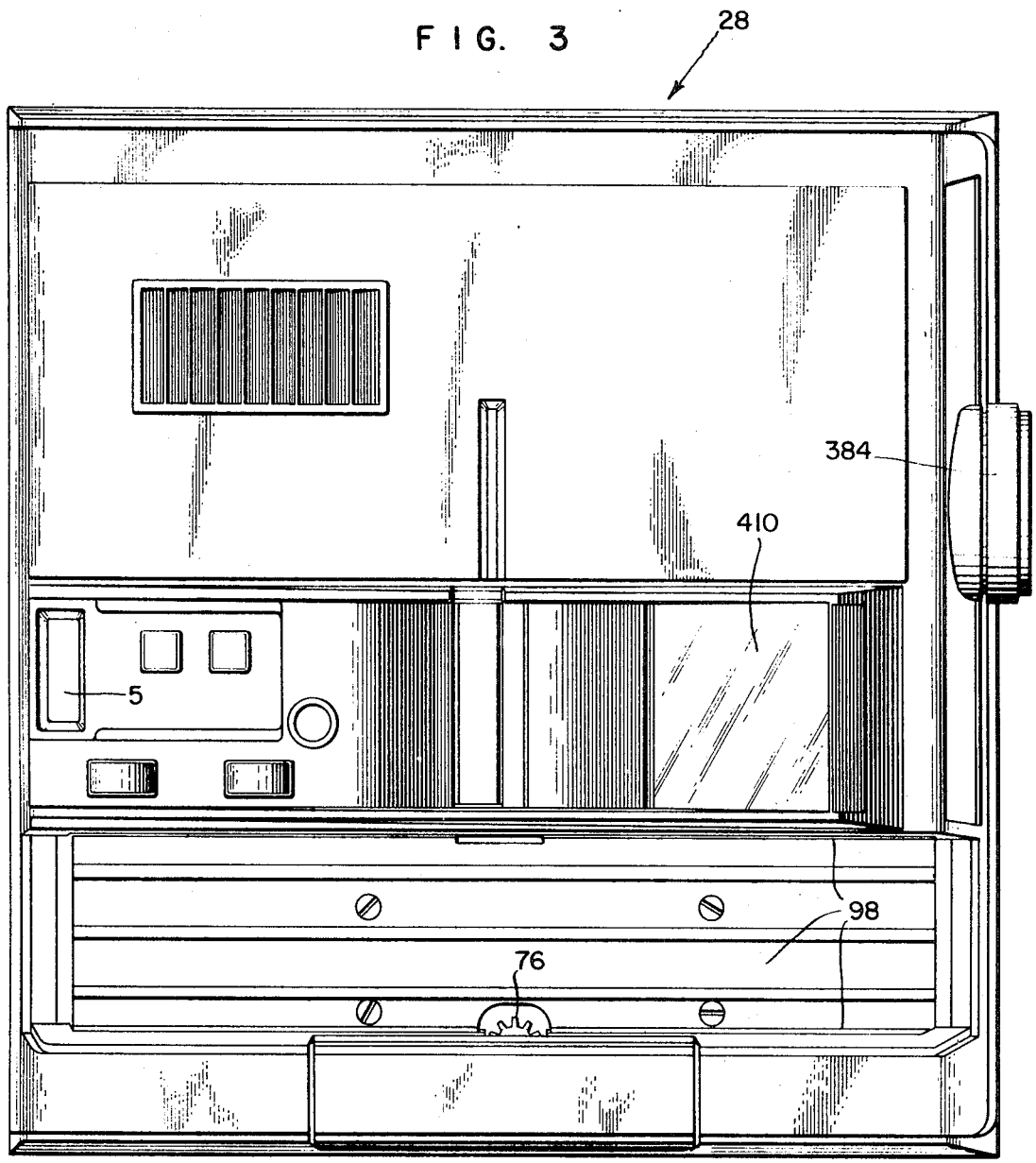
FIG. 3 is an external plan view of the projector showing the position of the tray holder and driving index pinion.

After the diffused light has passed through the second transparency 101 its light image is projected by means of an inexpensive lens 404 and a light stop 406 onto a second reflector 408 that is located within the projector 28 as is shown in detail in FIGS. 2 and 4 or vertically located as shown in FIG. 27.

The light image of the transparency 101 that has been cast on the sloped second reflector 408 is observed by the projectionist through a viewing window 410 that forms a top wall portion of the projector 28.

It is imperative that maximum use be made of the rays of light that are employed to cast the image and color of the transparency 101 by way of reflector 408 onto the viewing window 410. To accomplish this the reflector 400 is constructed of a metal plate which is preferably aluminum with a bright mirror substantially spherical reflecting surface 412 and a mask 414 on its nonreflecting convex side and which is shown terminating at its open end in four concave edge portions 416, 418, 420 and 422 that form a square.

When the aforementioned construction of a reflector 400 is employed as shown in FIG. 27 a cone of light rays 424 can be received by the reflector and reflected as a square beam of light rays 426 through the diffusing plate 402 and transparency 101 which are each of substantially the same square shape as the square beam of light.

The square light beam focusing construction also allows diffused light rays, such as for example rays 428, 430, 432, to be passed to the right away from the diffusing plate 402 in a uniform scattered manner in different angular directions so that substantially every minute area of the transparency will glow uniformly with a high degree of resolution and an exceptionally high degree of color intensity.

The resultant glowing light image will have substantially no undesired uneven light distribution due to the fact that only a square beam of light that is of the same size as the diffusing plate 402 and transparency 101 is allowed to pass through the last two mentioned parts. Hence no uneven light illumination of the image on the screen that would otherwise take place due to the nonuniform light passing through and around the outer edge of the slide can take place as has heretofore been the case when reflectors other than the reflector construction shown in detail in FIGS. 28, 29, and 30 are used.

The resultant glowing light undistorted image of the transparency 101 can then be readily focused by means of an inexpensive lens 404 and the light stop 406 onto a second sloping reflector 408 and thence onto the viewing window 410 shown in FIGS. 5 and 6.

Figure 19:
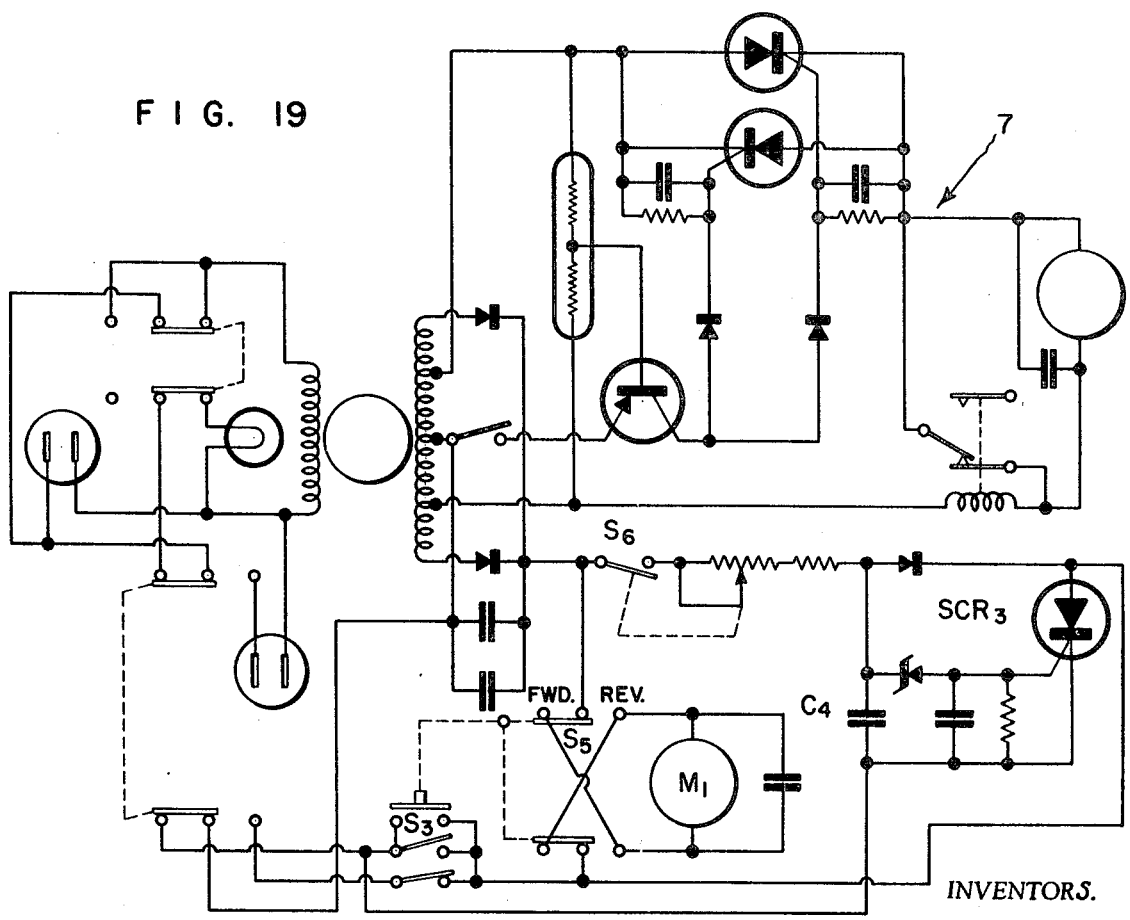
FIG. 19 shows an electric circuit 7 to provide automatic focusing and further shows an electric timing circuit 8 for providing automatic slide change therewith which can be manually adjusted to alter the time interval allotted between the changing of slides.

The subject matter disclosed but not claimed herein is disclosed and claimed in the copending applications which follow:

The Auto focus circuit portion to of FIG. 19 is disclosed in the U.S. Pat. application Ser. No. 759,546 to Robert H. Wallace filed on Sept. 13, 1968;

The Indexing Mechanism is disclosed in the U.S. Pat. application Ser. No. 759,635 to Stephen Blecher filed on Sept. 13, 1968;

The Previewing apparatus is disclosed in the U.S. Pat. application Ser. No. 759,673 to John P. Mahoney filed on Sept. 13, 1968;

The Slide Storage Shelf is disclosed in the U.S. Pat. application Ser. No. 759,636 to R. L. Pennock filed on Sept. 13, 1968;

The External Design of the projector is disclosed in the U.S. Pat. application Ser. No. 13,530 to Wallace A. Monson filed on Sept. 13, 1968, now issued U.S. Pat. No. 216,378.

The embodiments of the invention in which an exclusive property or privilege is claimed are defined as follows:

1. In a slide projector, comprising means for receiving slides to be projected, a slide actuating means to move a first selected one of two adjacent slides from the receiving means in a straight path into a position for previewing and for substantially simultaneously moving the other of said two slides past said slide in the preview position into a show position for projecting on a viewing screen said projector including means constraining said slides to move in said straight path and wherein the slide actuating means is further operably connected to return said two slides in a reverse direction along their respective straight line paths into said slide receiving means.

2. The apparatus as defined in claim 1 wherein the slide actuating means is comprised of a reversible gear reduction driving means, a pair of slide pulling jaws positioned adjacent the slide receiving means, a cam actuated pusher arm operably connected for movement with the driving means to simultaneously move said two slides out of and away from said receiving means into gripping relation with said jaws, a mechanism operably connected to said gear reduction driving means to move the jaw and slides contained therein between the position adjacent said slide receiving means to said preview position and said show position, and stops positioned in spaced relation with one another to respectively wipe off said first slide and second slides from said jaws as said jaws are moved through said previewing position and to wipe off said second slide from said jaws as said jaws are moved through said show position.

3. The slide projector defined in claim 1 wherein an ejector arm is mounted for pivotal movement on the slide actuating means and for simultaneous movement along a stationary cam track that has a protrusion at one end, said ejector arm being operably connected to engage and eject both slides jointly from the slide actuating means into the receiving means when the ejector arm engages said protrusion and before the slide actuating means is returned to its first position adjacent said slide receiving means.

4. The slide projector defined in claim 1 wherein the slide actuating means is comprised of a reversible scotch yoke driving means, comprising a crank arm operably connected to be driven in a clockwise and counterclockwise direction and having a driving pin at an outer driving end thereof, a crank slider operably mounted for sliding movement along a stationary guide rod as the driving pin that is in contact with the crank slider is rotated in either direction, a cross plate mounted for movement with the crank slider along said rod, a pair of spring bias jaws mounted for movement on the cross plate to engage said two slides and transport them away from their positions adjacent said slide receiving means to their preview and show positions and to return them in a direction toward said slide receiving means during a complete rotation of said crank arm.

5. The slide projector defined in claim 1 wherein the slide actuating means is comprised of a reversible scotch yoke driving mechanism, comprising a crank arm operably connected to be driven in a clockwise and counterclockwise direction and having a driving pin at an outer driving end thereof, a crank slider operably mounted for sliding movement along a stationary guide rod as the driving pin that is in contact with the crank slider is rotated in either direction, a cross plate mounted for movement with the crank slider along said rod, a pair of spring bias jaws mounted for movement on the cross plate to engage said two slides and transport them away from their positions adjacent said slide receiving means to their preview and show positions and to return them in a direction toward said slide receiving means during a complete rotation of said crank arm and wherein the jaws are comprised of a unitary transport member having a central plate member and a first spring biased member mounted on one side thereof to retain a first one of said two slides therebetween and having a second spring bias member mounted on an opposite side of the central plate member to retain the other of said two slides therebetween.

6. The slide projector defined in claim 1 wherein the slide actuating means is in synchronous driving relation with an indexing means employed to drive said slide receiving means one septum distance in a forward direction and to a position in which the slide actuating means will simultaneously transport said first mentioned returned slide to said position and a third slide in said slide receiving means, that is adjacent to said first slide, to said preview position.

7. The slide projector defined in claim 1 wherein the slide actuating means is in synchronous driving relation with an indexing means employed to drive said slide receiving means one septum distance in a reverse direction and to a position in which the slide actuating means will simultaneously transport said second mentioned slide to said preview position and another fourth slide in said slide receiving means that is adjacent said second slide to said show position.

8. The apparatus as defined in claim 1 wherein two aligned opposing spaced apart tracks are positioned in the projector along the top and bottom surfaces of said slides to maintain the adjacent faces of said two adjacent slides in fixed spaced apart relation with one another and to thereby guide opposite edge surfaces of said two slides as they are simultaneously moved by the slide actuating means between said receiving means and their respective preview and show positions.

9. The apparatus as defined in claim 1 wherein the constraining means is comprised of two aligned opposing spaced apart tracks positioned in the projector along the top and bottom surfaces of said slides to maintain the adjacent faces of said two adjacent slides in fixed spaced apart relation with one another and to thereby guide opposite edge surfaces of said two slides as they are simultaneously moved by the slide actuating means between said receiving means and their respective preview and show positions and wherein each of said opposing tracks is formed of a protuberance containing opposite flat surfaces against which opposing edge surfaces of said slides can be slidably engaged, separated inclined wall surfaces extending from the base of each protuberance to provide additional track surfaces against which other distantly located edge surface portions of said adjacent slides can be slidably engaged.

10. The apparatus as defined in claim 1 wherein the constraining means is comprised of two aligned opposing spaced apart tracks positioned in the projector along the top and bottom surfaces of said slides to maintain the adjacent faces of said two adjacent slides in fixed spaced apart relation with one another and to thereby guide opposite edge surfaces of said two slides as they are simultaneously moved by the slide actuating means between said receiving means and their respective preview and show positions and wherein one of the two tracks is mounted for flexible movement toward and away from the other track to accommodate the passage of slides of different thickness between said tracks without altering said distance between the adjacent faces of said slides.